April 8, 1930.  W. MELAS  1,753,469
FLOW METER
Filed Dec. 6, 1926    3 Sheets-Sheet 1
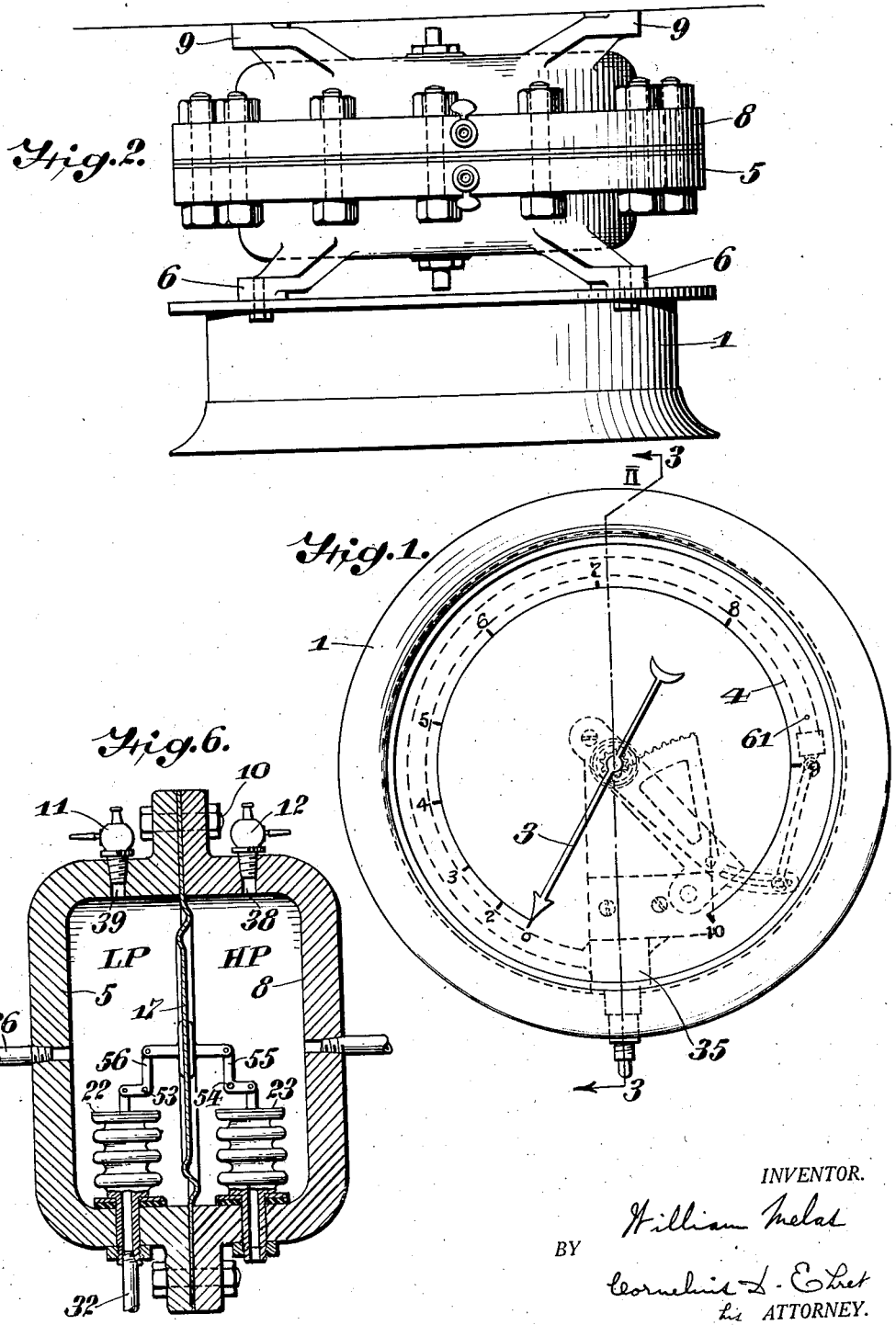

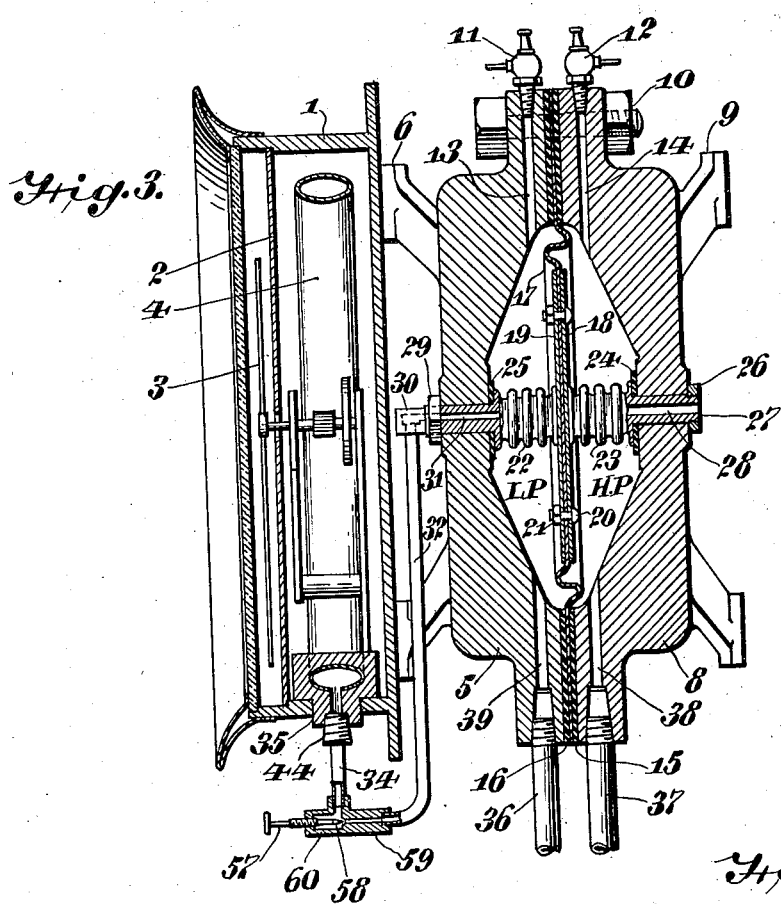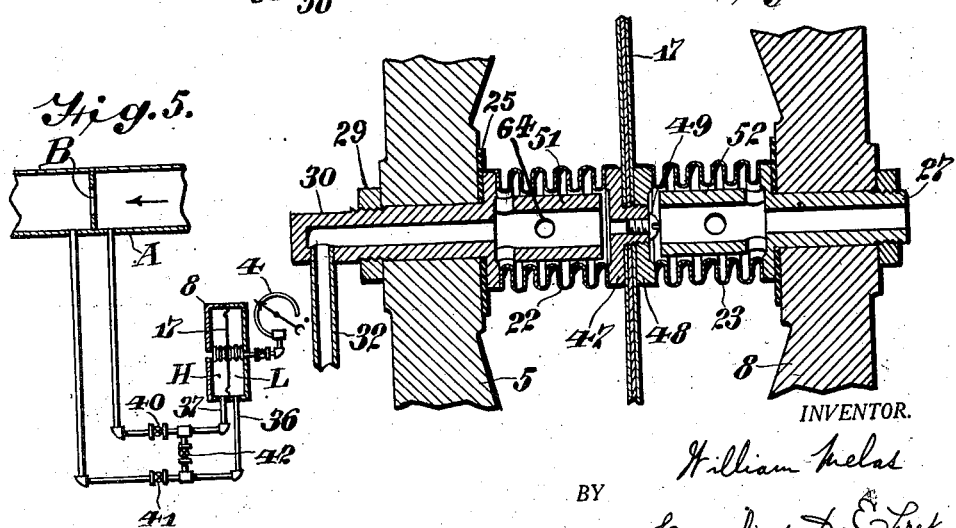

April 8, 1930. W. MELAS 1,753,469
FLOW METER
Filed Dec. 6, 1926  3 Sheets-Sheet 3

INVENTOR.
William Melas
BY
Cornelius A. Street
ATTORNEY.

Patented Apr. 8, 1930

1,753,469

UNITED STATES PATENT OFFICE

WILLIAM MELAS, OF PHILADELPHIA, PENNSYLVANIA

FLOW METER

Application filed December 6, 1926. Serial No. 152,951.

My invention relates to flow meters for measuring or indicating the rate of flow of a liquid, vapor or gas, and, more particularly, to that type of flow meter in which the rate of flow is represented by a pressure, more particularly a differential pressure, which is utilized in indicating or measuring the rate of flow.

In accordance with my invention a pressure, more particularly a differential pressure, representative of the rate of flow is, in effect, amplified, and the amplified pressure is applied to a pressure-indicating instrument, as a pressure gauge, for example one of the Bourdon type; more particularly in accordance with my invention, the pressures whose difference is representative of the rate of flow are applied to opposite sides of a movable member which, in turn applies to a liquid in a passage of cross sectional area small in comparison to the area of the movable member, a pressure corresponding with, but materially greater than, the differential pressure, and the amplified pressure is then applied by means of said liquid, to the movable system of an indicating instrument, such as a pressure gauge.

My invention resides in a system and apparatus of the character hereinafter described and claimed.

For an understanding of some of the various forms my apparatus may take, reference is to be had to the accompanying drawings, in which:—

Fig. 1 is a front elevation of an embodiment of my invention.

Fig. 2 is a plan view of the device shown in Fig. 1.

Fig. 3 is a side, sectional view, with parts in elevation, taken on a line 3—3 of Fig. 1.

Fig. 4 is a detailed view on an enlarged scale, of parts shown in Fig. 3.

Fig. 5 is a diagrammatic view illustrating a system in which the device may be used.

Fig. 6 is a sectional view, showing parts in elevation, of a modified form of the invention.

Figure 7:
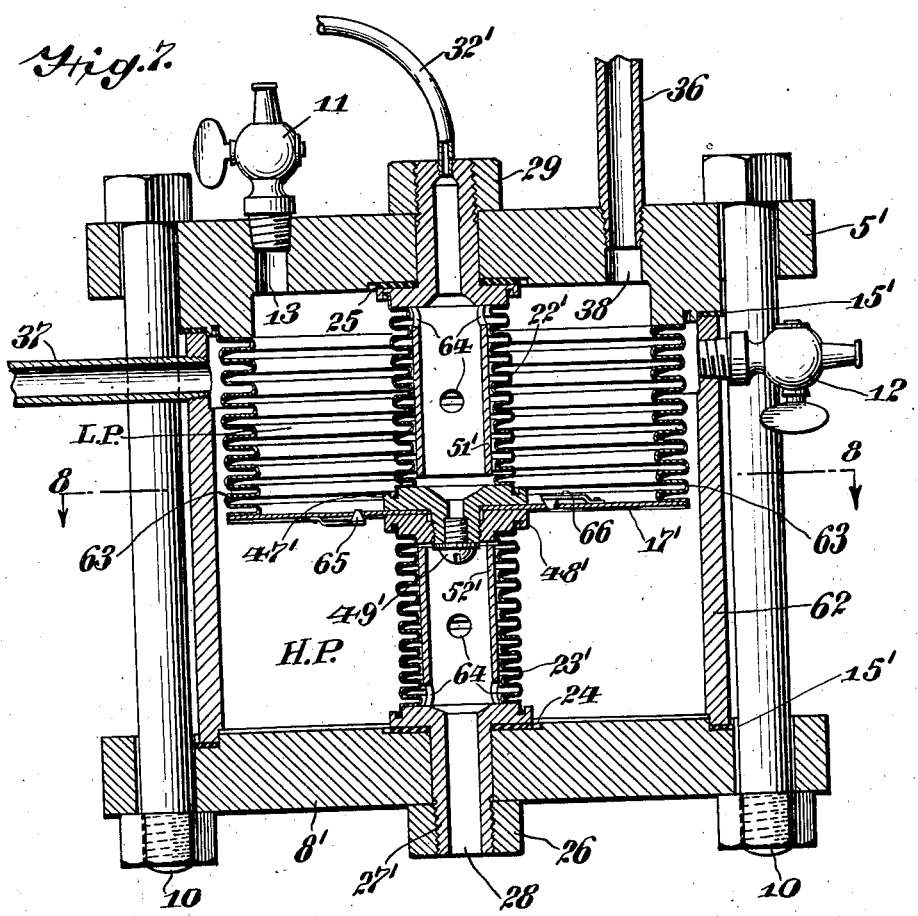
Fig. 7 is a side, sectional view of the preferred form of my invention.

Referring to the drawings, 1 is a pressure gauge of the Bourdon type having a tube 4 which varies in form with the amount of pressure applied thereto and whose variations are communicated through suitable linkage to a movable pointer 3, cooperating with the scale 2 to give an indication of the corresponding applied pressure. The gauge 1 is mounted, by means of cap screws, bolts, or any suitable fastening means, to the brackets 6 on one face of the housing 5. The other face of the housing is recessed for a purpose hereinafter described. The bolts 10 pass through a number of holes in the flange of housing 5 and the flange of a similar housing 8, to hold these members together with their recessed faces adjacent to each other. The entire assembly may be then mounted in any convenient place and manner by means of the brackets 9 which may be integral with the housing 8.

The flexible member or diaphragm 17 and the gaskets 15 and 16 on each side thereof, are clamped between the inner faces of the housing members to form two chambers, HP and LP as shown in Fig. 3, which are each connected respectively, to the high and low pressures whose difference is to be measured, by means of the passages 38 and 39. The holes 13 and 14 with their associated pet cocks 11 and 12 are provided to permit the escape of entrapped air or gas from the chambers when the system contains a liquid.

The hollow rod or tube 30 passes through the casing 5 at a point opposite the center of and at right angles to, a face of the diaphragm 17. It is fixedly held in the proper position by nut 29 threaded onto a portion of the rod extending outside of the casing. The gasket 25 is provided, at the point shown, to prevent leakage.

A flexible axially-collapsible member 22, circular in cross section, is brazed or soldered at one end of the flanged rod 30 whose extension 51 serves as a guide for maintaining the collapsible member in a centralized position with respect to the diaphragm 17. The other end of the collapsible member may be soldered or brazed to the central portion of plate 19 which is firmly attached to the diaphragm by means of bolts 20 and nuts 21. However, the preferred mode of connecting the collapsible member to the diaphragm will be herein later described.

The interior of the bellows 22 is placed in operative relation with the expansible tube 4 of the gauge by means of passage 31 in the tube 30, pipe 32, valve 59, pipe 34 and connection plugs 44 and 35. These elements constitute a closed system which is filled with a liquid.

A bellows 23, similar in construction to bellows 22 and having an equal cross sectional area, is mounted in the housing 8 with its longitudinal axis coincident with that of 22, as shown, and on the opposite side of the diaphragm therefrom. The interior of the bellows is in communication with the atmosphere or medium in which the device operates. It is important to note at this point that the cross sectional area of the bellows 22 and, therefore, the cross sectional area of the contained liquid is small as compared to the area of the diaphragm subjected to the opposing pressures, and that the bellows 22 and 23 are equal in cross sectional area. It is evident that if the pressure in chamber HP is greater than that in chamber LP, the diaphragm 17 exerts a force on the end of bellows 22. The unit pressure applied to the liquid contained therein is equal to the product of the area of the diaphragm minus the area of the bellows, which is the effective working area of the diaphragm, and the unit differential pressure on the diaphragm divided by the cross-sectional area of the bellows. The differential pressure exerted on the diaphragm is, therefore, in effect, magnified and imposed upon the liquid column in the bellows. In accordance with Pascal's principle, the amplified pressure is then transmitted, undiminished to the pressure responsive element of the gauge.

The bellows 23 is as above stated, of the same cross-sectional area as bellows 22 and is in axial alignment therewith, on the other side of and in contact with the diaphragm 17. The effect of such construction is to make the pressure exposed surfaces of the diaphragm equal in each of the pressure chambers so that with equal pressure therein there is no force exerted on the liquid column.

In the absence of such a provision, there would be a force applied to the column when the pressures in the HP and LP chambers were equal and the magnitude of the force would vary as the equal forces varied. Under such circumstances, it would be manifestly impossible to determine the rate of flow from the gauge unless the main pressure were known. In other words, it would not be possible to get a direct reading from the device in terms of differential pressure or of rate of flow. Therefore, to provide an indicator having the same zero point independent of the value of the equal pressures, it is necessary that the surfaces exposed to the pressures to be made equal in area, such as in the manner described.

In my preferred method of connecting the bellows to the diaphragm, the plates 18 and 19 may be dispensed with, unless it is desirable to retain them as stiffening members. The open end of member 22, instead of being brazed or soldered to the plate 19, is similarly attached to a cap member 47 having an external threaded extension which passes through an aperture in the diaphragm and cooperates with an internally threaded cap member brazed or soldered in the end of bellows 23, to secure them both in intimate contact with the diaphragm.

The cap member 47 is adapted to engage extension or stop 51 upon excessive movement of the diaphragm, in that direction, due to an abnormal difference of pressure in the chambers HP and LP. This not only prevents direct damage to the diaphragm and bellows but also consequential injury to the sensitive indicating instrument resulting from the application thereto of a pressure greater than that for which it was designed.

The holes 64 are provided in the guide members 51 and 52 to permit a ready transfer of pressure from the interior of the axially collapsible members or bellows, to the interior of the guides. The clearance between the exterior guides and the interior of the axially collapsible member or bellows is necessarily so slight that in the absence of such a provision there would be an appreciable lag in the operation of the device.

The screw 49, having threaded engagement with the tapped hole extending through the cap 47, is provided to form a convenient means for filling the closed system above referred to. The liquid is introduced into the interior of bellows 22 through the trapped hole, until it begins to leak out of the pin hole 61 in the Bourdon tube. The hole is then sealed in any suitable manner, the screw 49 is reinserted and the system is then in operative condition.

The adjustable member 57 may be used to isolate the indicating system from the rest of the closed pressure system by causing the valve 58 to seat and may also be used as a zero correction for the instrument by varying the amount of displacement of liquid in the reservoir 60.

In the modification of my invention shown in Fig. 6, parts corresponding to the form described are indicated by the same reference characters. In this form the force-transmitting system is the same as described, but the amplifying system used in connection therewith consists of a bell crank lever pivoted at 53 to a fixed part of the housing 5. The ends of the lever are connected to a diaphragm 17 and the bellows 22, respectively. By properly designing the lengths of the lever arms, it is possible to obtain any desired ratio of the differential pressure applied and the pressure of the liquid in the bellows 22. The bellows 23, whose interior is in communication with the air or other medium, is connected to the opposite side of the diaphragm 17 through an identical lever arm 55, pivoted at 54.

The further points of difference are so slight and apparent that a further description is considered unnecessary.

Figure 8:
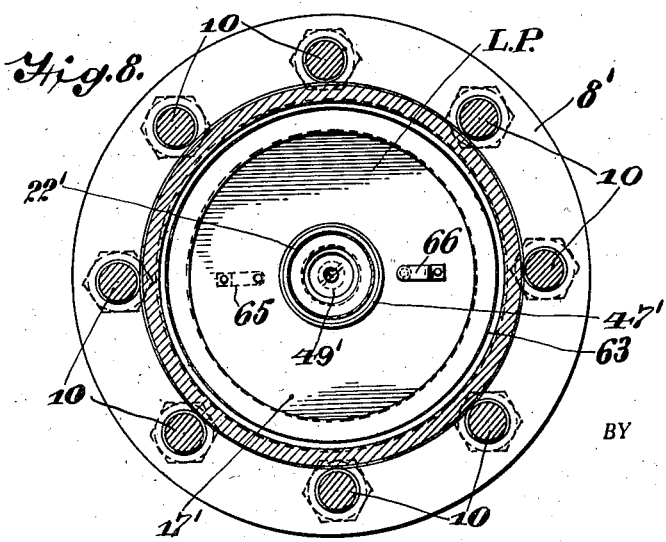
Fig. 8 is a sectional view taken on line 8—8 of Fig. 7.

In the preferred form of my invention shown in Figs. 7 and 8, the parts corresponding to those described in the preceding modifications are indicated by the same reference characters, those retaining the same general function but differing slightly in structure, by the same reference character primed. The cap members 5' and 8' are each provided with a series of spaced holes through which pass the bolts 10. The adjacent faces of the cap members are provided with a circular groove adapted to receive the end of a cylindrical member 62 which is clamped with a gasket 15' at each end thereof, between the cap members to form a pressure chamber as shown, i. e.—the high pressure chamber HP. Two opposed axially collapsible members 22' and 23', equal in cross-sectional area and corresponding in general in construction and function to the similar members 22 and 23 of Fig. 4, engage and are fastened to, the cap members 47' and 48' disclosed in Fig. 7. The movable, pressure actuated member 17' is clamped between them in the same described manner as is diaphragm 17 of Fig. 4. In this modification of my invention, the pressure responsive element is permitted to have a greater range and freedom of movement by leaving its edge unattached with respect to any fixed part, so that it is freely movable as a whole. The other, or low, pressure chamber LP comprises a collapsible member 63 brazed at one open end to the outer edge of the member 17' and at the other end to the cap member 5'. The pipes 36 and 37 communicate with the LP and HP chambers respectively for a purpose hereinafter described.

The relief valves 65 and 66 are provided on the movable member 17' as shown and are so designed that upon the application of a given excess of differential pressure, one or the other of the valves, depending upon which side of the member is subjected to the excess pressure, will afford communication to the other side of the member, equalizing the pressures in the HP and LP chambers and so preventing injury to the apparatus.

To describe briefly the operation of the device in a system in which it may be used, reference is made to Fig. 5. The fluid whose rate of flow is to be gauged is assumed to be moving in the direction of the arrow in the main A through a restricted flow passage represented by the apertured disk B. For reasons familiar to those skilled in the art, there is a difference between the pressures on each side of the restriction which bears a definite relation to the rate of flow. The pipes 36 and 37 transmit the pressures whose difference is to be measured to chambers HP and LP of the flow meter. The valves 40, 41 and 42 are manipulated so that at no time there will be pressure from the main A on one side of the diaphragm only.

As before described, the diaphragm or equivalent member will be moved by the differential pressure to exert a pressure corresponding with, but considerably greater than, the unit differential pressure to the liquid in the bellows 22. This amplified pressure is transmitted through the liquid to the pressure tube 4 of the gauge which expands and causes the pointer 3 to move over the scale 2. The scale may be calibrated in units of rate of flow so that an indication may be read directly in terms of rate of flow.

The same device may also be utilized to indicate differential pressures from other sources and otherwise produced.

What I claim is:

1. An instrument having a pressure-actuated element, means movable thereby to an extent dependent upon magnitude of pressure applied to said element, a liquid column for transmitting applied pressures to said element, means to retain said liquid column, a movable member having an area exposed to differential pressure and a different area exposed to said liquid column, whereby the pressure applied to and transmitted by said column corresponds to, but differs from that exerted on said first-named exposed area, and valve structure mounted on said movable member for preventing the application of an excess pressure to said liquid column.

2. An instrument having a pressure-actuated element, means movable thereby to an extent dependent upon magnitude of pressure applied to said element, a liquid column for transmitting applied pressures to said element, means to retain said liquid column, a movable member having an area exposed to differential pressure and a different area exposed to said liquid column, whereby the pressure applied to and transmitted by said column corresponds to, but differs from, that exerted on said first-named exposed area, and means mounted on said movable member for preventing the application of an excess pressure to said movable member.

3. The combination of a housing, pressure chambers within said housing, a substantially rigid member movable axially in response to difference of pressure in said chambers, a member flexibly connecting said member to said housing and constituting therewith a wall of said pressure chambers, an instrument having a pressure operated element, means movable thereby to an extent dependent upon pressure applied to said element, a liquid column to transmit pressure to said element, and means, including an axially collapsible member within one of said chambers and operatively connected to said movable member, to retain said liquid column.

4. Flow-measuring apparatus comprising a housing, a wall dividing said housing interiorly into pressure chambers and movable in response to difference of pressure, a collapsible member disposed within said housing in one of said chambers, connected to said wall and containing liquid, an instrument having a pressure-actuated element, liquid including said liquid within said collapsible member for transmitting pressure to said element, and means to retain said liquid including structure having a passage connecting said instrument and said collapsible member.

5. Flow-measuring apparatus comprising a housing, a wall dividing said housing into pressure chambers and movable in response to difference of pressure, a liquid mass terminating within said housing in one of said chambers and in engagement with a portion of said wall, an instrument having a pressure-actuated element, and means to retain said liquid comprising a hollow, collapsible member within said one of said pressure chambers, and means connecting said pressure-actuated element and said collapsible member.

6. A housing, a wall dividing said housing into pressure-chambers and movable in response to difference of pressure, a tubular member extending through said housing and terminating short of said wall, and a hollow, collapsible member connected at opposite ends to said movable wall and said housing respectively, surrounding said tubular member within one of said chambers.

7. Flow-measuring apparatus comprising a housing, a wall dividing said housing interiorly into pressure chambers and movable in response to difference of pressure, collapsible members of equal cross-sectional area disposed respectively in said chambers and in engagement with opposite sides of said wall, one of said members being in communication with atmosphere and another containing liquid, an instrument having a pressure-actuated element, and means to actuate said element in response to difference of pressure of said chambers comprising a liquid including said liquid within said collapsible member.

8. Flow-measuring apparatus comprising a housing, a wall dividing said housing into pressure chambers and movable in response to difference of pressure, a tubular member having corrugated flexible wall structure connected to said wall, an instrument having a pressure-actuated element, means to apply pressure thereto comprising a liquid mass, and means to retain said liquid comprising said tubular member.

9. Flow-measuring apparatus comprising a housing, a wall dividing said housing into pressure chambers and movable in response to difference of pressure, an axially collapsible member connected to said wall, an instrument having a pressure-actuated element, means to apply pressure thereto comprising a liquid mass, means to retain said liquid comprising said tubular member and a closed reservoir of capacity adjustable to insure correct reading of said instrument.

WILLIAM MELAS.